US010297070B1

(12) United States Patent
Zhu et al.

(10) Patent No.: US 10,297,070 B1
(45) Date of Patent: May 21, 2019

(54) 3D SCENE SYNTHESIS TECHNIQUES USING NEURAL NETWORK ARCHITECTURES

(71) Applicant: Inception Institute of Artificial Intelligence, Ltd., Abu Dhabi (AE)

(72) Inventors: Fan Zhu, Abu Dhabi (AE); Li Liu, Abu Dhabi (AE); Jin Xie, Abu Dhabi (AE); Fumin Shen, Chengdu (CN); Ling Shao, Abu Dhabi (AE); Yi Fang, Abu Dhabi (AE)

(73) Assignee: Inception Institute of Artificial Intelligence, Ltd, Abu Dhabi (AE)

( * ) Notice: Subject to any disclaimer, the term of this patent is extended or adjusted under 35 U.S.C. 154(b) by 0 days.

(21) Appl. No.: 16/161,704

(22) Filed: Oct. 16, 2018

(51) Int. Cl.
| *G06K 9/00* | (2006.01) |
| *G06T 15/20* | (2011.01) |
| *G06N 3/04* | (2006.01) |
| *G06N 3/08* | (2006.01) |
| *G06K 9/62* | (2006.01) |

(52) U.S. Cl.
CPC ........ *G06T 15/205* (2013.01); *G06K 9/00624* (2013.01); *G06K 9/6256* (2013.01); *G06K 9/6262* (2013.01); *G06K 9/6268* (2013.01); *G06N 3/0445* (2013.01); *G06N 3/0454* (2013.01); *G06N 3/08* (2013.01); *G06T 2210/04* (2013.01)

(58) Field of Classification Search
CPC .............. G06T 15/205; G06T 2210/04; G06K 9/00624; G06K 9/6262; G06K 9/6268; G06K 9/6256; G06N 3/0445; G06N 3/0454; G06N 3/08
See application file for complete search history.

(56) References Cited

U.S. PATENT DOCUMENTS

| 6,539,354 | B1 * | 3/2003 | Sutton | G10L 21/06 345/423 |
| 8,553,037 | B2 * | 10/2013 | Smith | G06T 13/40 345/473 |
| 10,106,153 | B1 * | 10/2018 | Xiao | G06K 9/00805 |

OTHER PUBLICATIONS

Martin Abadi, Ashish Agarwal, Paul Barham, Eugene Brevdo, Zhifeng Chen, Craig Citro, Greg S Corrado, Andy Davis, Jeffrey Dean, Matthieu Devin, et al. 2015. TensorFlow: Large-scale machine learning on heterogeneous systems, 2015. Software available from tensorflow. org 1 (2015).
Jose M Alvarez, Theo Gevers, Yann LeCun, and Antonio M Lopez, 2012. Road scene segmentation from a single image. In European Conference on Computer Vision. Springer, 376-389.

(Continued)

*Primary Examiner* — Shefali D Goradia
(74) *Attorney, Agent, or Firm* — Bryan Cave Leighton Paisner LLP

(57) ABSTRACT

This disclosure relates to improved techniques for synthesizing three-dimensional (3D) scenes. The techniques can utilize a neural network architecture to analyze images for detecting objects, classifying scenes and objects, and determining degree of freedom information for objects in the images. These tasks can be performed by, at least in part, using inter-object and object-scene dependency information that captures the spatial correlations and dependencies among objects in the images, as well as the correlations and relationships of objects to scenes associated with the images. 3D scenes corresponding to the images can then be synthesized using the inferences provided by the neural network architecture.

20 Claims, 4 Drawing Sheets

(56) References Cited

OTHER PUBLICATIONS

Wonmin Byeon, Thomas M Breuel, Federico Raue, and Marcus Liwicki. 2015. Scene labeling with lstm recurrent neural networks. In IEEE Conference on Com-puter Vision and Pattern Recognition, 3547-3555.

João Carreira, Fuxin Li, and Cristian Sminchisescu. 2012. Object recognition by sequential figure-ground ranking. International Journal of Computer Vision 98, 3 (2012), 243-262.

Joao Carreira and Cristian Sminchisescu. 2012. Cpmc: Automatic object seg-mentation using constrained parametric min-cuts. Pattern Analysis and Machine Intelligence, IEEE Transactions on 34, 7 (2012), 1312-1328.

Chih-Chung Chang and Chih-Jen Lin. 2011. LIBSVM: a library for support vector machines. ACM Transactions on Intelligent Systems and Technology 2, 3 (2011), 27.

Xiaozhi Chen, Kaustav Kundu, Ziyu Zhang, Huirnin Ma, Sanja Fidler, and Raquel Urtasun. 2016. Monocular 3d object detection for autonomous driving. In Proceedings of the IEEE Conference on Computer Vision and Pattern Recognition. 2147-2156.

Jeffrey Donahue, Lisa Anne Hendricks, Sergio Guadarrama, Marcus Rahrbach, Subhashini Venugopalan, Kate Saenko, and Trevor Darrell. 2015. Long-term recurrent convolutional networks for visual recognition and description. In IEEE Conference on Computer Vision and Pattern Recognition. 2625-2634.

Li Fei-Fei and Pietro Perona. 2005. A bayesian hierarchical model for learning natural scene categories. In IEEE Computer Society Conference on Computer Vision and Pattern Recognition, vol. 2. IEEE, 524-531.

Pedro F Felzenszwalb, Ross B Girshick, David McAllester, and Deva Ramanan, 2010. Object detection with discriminatively trained part-based models. Pattern Analysis and Machine Intelligence, IEEE Transactions on 32, 9(2010), 1627-1645.

Sanja Fidler, Sven Dickinson, and Raquel Urtasun, 2012, 3d object detection and viewpoint estimation with a deformable 3d cuboid model. In Advances in Neural Information Processing Systems. 611-619.

Matthew Fisher, Daniel Ritchie, Manolis Savva, Thomas Funkhouser, and Pat Hanrahan. 2012. Example-based synthesis of 3D object arrangements. ACM Transactions on Graphics (TOG) 31, 6 (2012), 135.

Roberto Diéguez Galvão. 2004. Uncapacitated facility location problems: contributions. Pesquisa Operacional 24, 1(2004), 7-38.

Ross Girshick, Jeff Donahue, Trevor Darrell, and Jitendra Malik. 2014. Rich feature hierarchies for accurate object detection and semantic segmentation. In IEEE conference on computer vision and pattern recognition. 580-587.

Stephen Gould, Paul Baumstarck, Morgan Quigley, Andrew Y Ng, and Daphne Keller. 2008. Integrating visual and range data for robotic object detection. In Workshop on Multi-camera and Muitimodal Sensor Fusion Algorithms and Applications—M2SFA2 2008.

Alan Graves, Abdel-rahman Mohamed, and Geoffrey Hinton. 2013. Speech recognition with deep recurrent neural networks. In IEEE International Conference on Acoustics, Speech and Signal Processing. IEEE, 6645-6649.

Saurabh Gupta, Pablo Arbeláez, Ross Girshick, and Jitendra Malik. 2015. Aligning 3D models to RGB-D images of cluttered scenes, In IEEE Conference on Computer Vision and Pattern Recognition. 4731-4740.

Saurabh Gupta, Pablo Arbeláez, Ross Girshick, and Jitendra Malik. 2015. Indoor scene understanding with RGB-D images: Bottom-up segmentation, object detection and semantic segmentation. International Journal of Computer Vision 112, 2 (2015), 133-149.

Saurabh Gupta, Ross Girshick, Pablo Arbeláez, and Jitendra Malik. 2014. Learning rich features from RGB-D images for object detection and segmentation. In European Conference on Computer Vision. Springer, 345-360.

Varsha Hedau, Derek Hoiem, and David Forsyth. 2010. Thinking inside the box: Using appearance models and context based on room geometry. In European Conference on Computer Vision. Springer, 224-237.

Andrej Karpathy and Li Fei-Fei. 2015. Deep visual-semantic alignments for generating image descriptions. In IEEE Conference on Computer Vision and Pattern Recognition, 3128-3137.

Z Sadeghipour Kermani, Zicheng Liao, Ping Tan, and H Zhang, 2016. Learning 3D Scene Synthesis from Annotated RGB-D Images. In Computer Graphics Forum, vol. 35. Wiley Online Library, 197-206.

Alex Krizhevsky, Ilya Sutskever, and Geoffrey E Hinton. 2012. Imagenet classification with deep convolutional neural networks. In Advances in neural information processing systems. 1097-1105.

Kevin Lai, Liefeng Bo, Xiaofeng Ren, and Dieter Fox, 2011. A large-scale hierarchical multi-view rgb-d object dataset. In IEEE International Conference on Robotics and Automation. IEEE. 1817-1824.

Svetlana Lazebnik, Cordelia Schmid, and Jean Ponce. 2006. Beyond bags of features: Spatial pyramid matching for recognizing natural scene categories. In IEEE Computer Society Conference on Computer Vision and Pattern Recognition, vol. 2. IEEE, 2169-2178.

Nevena Lazic, Inmar Givoni, Brendan Frey, and Parham Aarabi. 2009. Floss: Facility location for subspace segmentation. In IEEE International Conference on Computer Vision. IEEE, 825-832.

Zhen Li, Yukang Gan, Xiaodan Liang, Yizhou Yu, Hui Cheng, and Liang Lin. 2016. LSTM-CF: Unifying Context Modeling and Fusion with LSTMs for RGB-D Scene Labeling. (2016).

Dahua Lin. Sonja Fidler, and Raquel Urtasun. 2013. Holistic scene understanding for 3d object detection with rgbd cameras. In IEEE International Conference on Computer Vision. 1417-1424.

Aude Oliva and Antonio Torralba. 2001. Modeling the shape of the scene: A holistic representation of the spatial envelope. International Journal of Computer Vision 42, 3 (2001), 145-175.

Megha Pandey and Svetlana Lazebnik. 2011. Scene recognition and weakly supervised object localization with deformable part-based models. In IEEE International Conference on Computer Vision. IEEE, 1307-1314.

Xiaofeng Ren, Liefeng Bo, and Dieter Fox. 2012. Rgb-(d) scene labeling: Features and algorithms. in IEEE Conference on Computer Vision and Pattern Recognition, IEEE, 2759-2766.

Olga Russakovsky, Jia Deng, Hao Su, Jonathan Krause, Sanjeev Satheesh, Sean Ma, Zhiheng Huang, Andrej Karpathy, Aditya Khosla, Michael Bernstein, et al. 2015. Imagenet large scale visual recognition challenge. International Journal of Computer Vision 115, 3 (2015), 211-252.

Bing Shuai, Zhen Zuo, Gang Wang, and Bing Wang. 2015. Dag-recurrent neural networks for scene labeling. arXiv preprint arXiv:1509.00552 (2015).

Nathan Silberman, Derek Hoiem, Pushmeet Kohli, and Rob Fergus. 2012. Indoor segmentation and support inference from RGBD images. In European Conference on Computer Vision, Springer, 746-760.

Shuran Song, Samuel P Lichtenberg, and Jianxiong Xiao, 2015. Sun rgb-d: A rgb-d scene understanding benchmark suite. In IEEE Conference on Computer Vision and Pattern Recognition. 567-576.

Shuran Song and Jianxiong Xiao. 2014. Sliding shapes for 3d object detection in depth images. In European Conference on Computer Vision, Springer, 634-651.

Min Sun, Gary Bradski, Bing-Xin Xu, and Silvio Savarese. 2010. Depth-encoded hough voting for joint object detection and shape recovery. In European Conference on Computer Vision. Springer, 658-671.

Antonio Torratba, Kevin P Murphy, William T Freeman, Mark Rubin, et al. 2003. Context-based vision system for place and object recognition. In IEEE International Conference on Computer Vision. IEEE, 273-280.

Jasper RR Uijlings, Koen EA van de Sande, Theo Gevers, and Arnold WM Smeul-ders. 2013. Selective search for object recognition. International Journal of Computer Vision 104, 2 (2013), 154-171.

Francesco Visin, Kyle Kastner, Kyunghyun Cho, Matted Matteucci, Aaron Courville, and Yoshua Bengio. 2015. Renet: A recurrent

(56) References Cited

OTHER PUBLICATIONS neural network based alternative to convolutional networks. arXiv preprint arXiv:1505.00393 (2015).

Julia Vogel and Beret Schiele. 2007. Semantic modeling of natural scenes for content-based image retrieval. International Journal of Computer Vision 72.2 (2007), 133-157.

Paul J Werbos. 1990. Backpropagation through time: what it does and how to do it. Proc. IEEE 78, 10 (1990), 1550-1560.

Zhirong Wu, Shuran Song, Aditya Khosla, Fisher Yu, Linguang Zhang, Xiaoou Tang, and Jianxiong Xiao. 2015. 3d shapenets: A deep representation for volumetric shapes. In Proceedings of the IEEE Conference on Computer Vision and Pattern Recognition. 1912-1920.

Jianxiong Xiao, James Hays, Krista Ehinger, Aude Oliva, Antonio Torratba, et al. 2010. Sun database: Large-scale scene recognition from abbey to zoo. In IEEE conference on Computer vision and pattern recognition. IEEE, 3485-3492.

Hongyuan Zhu, Jean-Baptiste Weibel, and Shijian Lu. 2016. Discriminative Multi-Modal Feature Fusion for RGBD Indoor Scene Recognition. In IEEE Conference on Computer Vision and Pattern Recognition. 2969-2976.

Long Zhu, Yuanhao Chen, Alan Yuille, and William Freeman. 2010. Latent hierarchical structural learning for object detection. In IEEE Conference on Computer Vision and Pattern Recognition. IEEE, 1062-1069.

Zhen Zuo, Bing Shuai, Gang Wang, Xiao Liu. Xingxing Wang, Bing Wang, and Yushi Chen. 2015. Convolutional recurrent neural networks: Learning spatial dependencies for image representation. In IEEE Conference on Computer Vision and Pattern Recognition Workshops. 18-26.

* cited by examiner

US 10,297,070 B1

3D SCENE SYNTHESIS TECHNIQUES USING NEURAL NETWORK ARCHITECTURES

TECHNICAL FIELD

This disclosure is related to techniques for synthesizing three-dimensional (3D) scenes from two-dimensional (2D) images utilizing neural networks and/or artificial intelligence (AI) algorithms.

BACKGROUND

The task of synthesizing a 3D scene from a 2D image is very difficult and complex. This is due, at least in part, to the fact that a significant amount of visual information is lost when a 3D environment is captured in a 2D image. One potential technique for addressing this loss of visual information can involve the use of depth images to synthesize a 3D scene. The depth images contain distance information relating to objects captured in the 2D image that can be used to synthesize the 3D scene. However, in many cases, depth images are not available and, therefore, cannot be used to synthesize the 3D scene.

BRIEF DESCRIPTION OF DRAWINGS

To facilitate further description of the embodiments, the following drawings are provided, in which like references are intended to refer to like or corresponding parts, and in which.

DETAILED DESCRIPTION OF EXEMPLARY EMBODIMENTS

Figure 1:
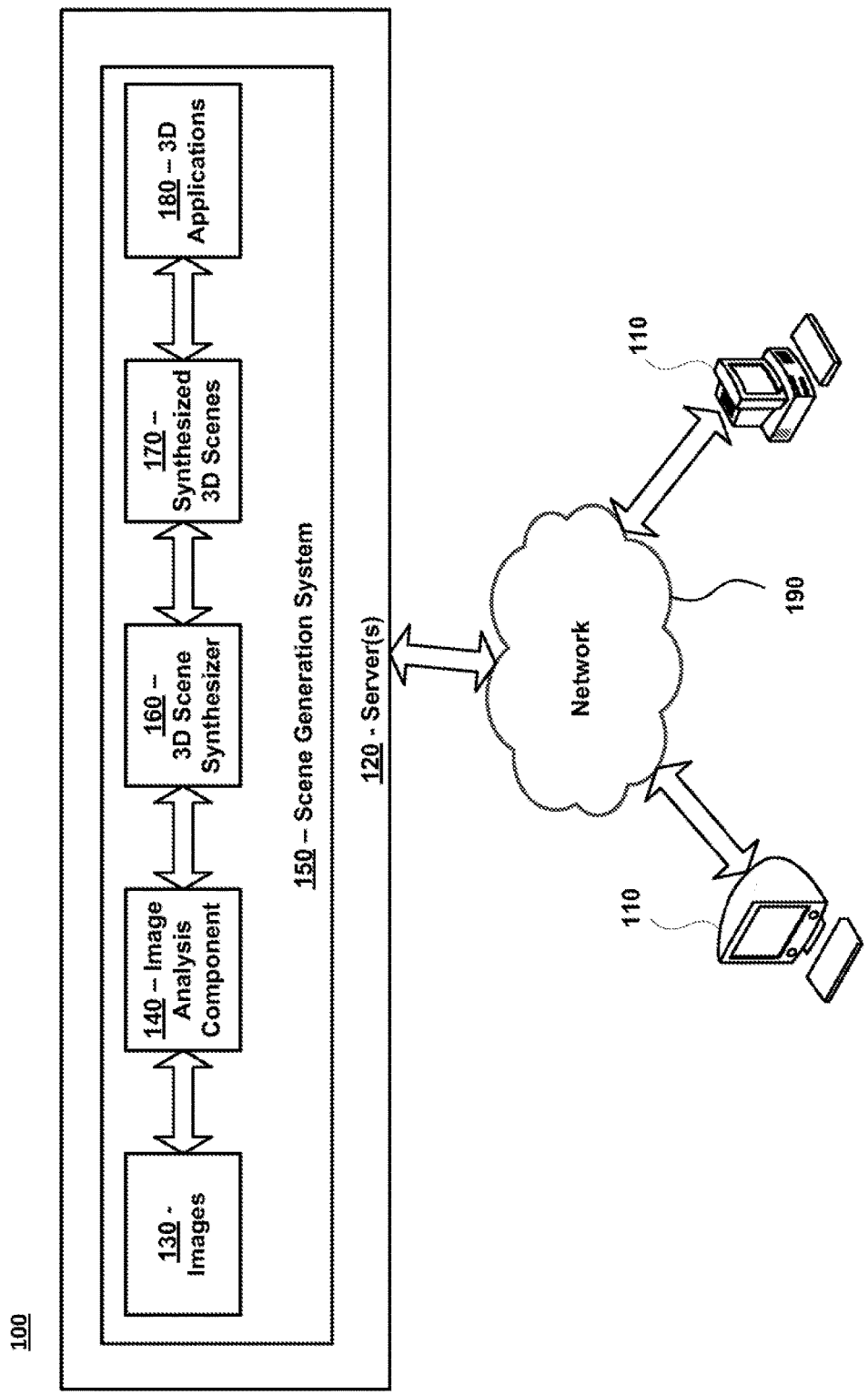
FIG. 1 is a block diagram of a system in accordance with certain embodiments.

The present disclosure relates to systems, methods, apparatuses, and techniques for synthesizing three-dimensional (3D) scenes. A scene generation system is configured to receive two-dimensional (2D) images and to synthesize 3D scenes corresponding to the 2D images. To facilitate the generation of the 3D scenes, a neural network architecture comprising one or more neural networks can be configured to analyze the 2D images to detect objects, classify scenes and objects, and determine degree of freedom (DOF) information for objects in the 2D images. The neural network architecture can perform these tasks, at least in part, by utilizing inter-object and object-scene dependency information that is learned by the neural network architecture. The inter-object and object-scene dependency information captures, inter alia, the spatial correlations and dependencies among objects in the 2D images, as well as the correlations and relationships of objects to scenes associated with the 2D images. A 3D scene synthesizer can utilize the knowledge from the neural network architecture to synthesize 3D scenes without using depth images for the 2D images.

In certain embodiments, the neural network architecture utilized by the scene generation system includes at least two neural networks, each of which is trained using a set of training images that are augmented or annotated with ground truth information. In certain embodiments, a first neural network can be trained to capture the inter-object and object-scene dependency information and to perform functions associated with object detection and scene classification. A second neural network can be trained to perform functions associated with calculating or estimating DOF information for the objects in the scenes of the 2D images. Each of two neural networks may be implemented as a convolutional neural network (CNN) or other similar type of neural network. For example, in certain embodiments, the first neural network can be implemented as a convolutional long short-term memory (Conv LSTM) and the second neural network can be implemented as a regression convolutional neural network (regression ConvNet).

In certain embodiments, the information extracted by the first neural network and the second neural network can be used jointly to provide inferences related to the 3D scenes being synthesized. For example, the extracted information can be used to make inferences that describe poses, positions, dimensions, and/or other parameters for the objects within the 3D scenes being synthesized. This information can then be utilized by the 3D scene synthesizer to generate 3D scenes corresponding to the 2D images.

The technologies discussed herein can be used in a variety of different environments. For example, as discussed in further detail below, the technologies discussed herein can be used to synthesize 3D scenes for use in applications and/or devices associated with virtual reality, intelligent robot navigation (e.g., intelligent vacuum devices), interior design, computer vision, surveillance, and/or visibility analysis. While some of the examples described herein may pertain to synthesizing 3D scenes for indoor environments, it should be recognized that the techniques can be used to generate 3D scenes for any environment, including both indoor and/or outdoor environments.

The embodiments described herein provide a variety of advantages over conventional scene generation techniques. One significant advantage is the ability to generate 3D scenes corresponding to 2D images without the use of depth information pertaining to the objects in the 2D images. Another significant advantage is that the scene generation techniques described herein are able to detect objects, classify objects and scenes, and determine DOF information with greater accuracy in comparison to conventional techniques. A further advantage is that the scene generation techniques described herein are able to synthesize the 3D scenes in a manner that significantly reduces errors in comparison to conventional techniques. These advantages can be attributed, at least in part, to the neural network configuration that allows for the capturing of the inter-object and object-scene dependency information (e.g., which indicates the spatial dependencies among objects in the 2D images, as well as the relationships of objects to scenes associated with the 2D images).

As evidenced by the disclosure herein, the 3D scene synthesis techniques set forth in the disclosure are rooted in computer technologies that overcome existing problems in known scene generation systems, including problems dealing with loss of information associated with capturing real-world 3D environments in 2D images. These techniques describe a technical solution (e.g., one that utilizes various AI-based and/or neural network-based techniques) for overcoming such limitations. For example, the scene generation system described herein can take advantage of novel AI and machine learning techniques to train neural networks to extract and infer information from 2D images that can be used to synthesize corresponding 3D environments associated with the 2D images. This technology-based solution marks an improvement over existing computing capabilities and functionalities related to 3D scene generation, and does so in a manner that improves the accuracy of the synthesized scenes.

In accordance with certain embodiments, a system is provided for synthesizing a 3D scene comprising: one or more computing devices comprising one or more processors and one or more non-transitory storage devices for storing instructions, wherein execution of the instructions by the one or more processors causes the one or more computing devices to: access a 2D image comprising a scene; execute a first neural network that is configured to determine a first set of inferences associated with detecting objects in the scene and classifying the scene; execute a second neural network that is configured to determine a second set of inferences associated with determining degree of freedom information for the objects in the scene; and synthesize a 3D scene that corresponds to the scene included in the 2D image using the first set of inferences provided by the first neural network and the second set of inferences provided by the second neural network.

In accordance with certain embodiments, a method is provided for synthesizing a 3D scene comprising: accessing a 2D image comprising a scene; executing a first neural network that is configured to determine a first set of inferences associated with detecting objects in the scene and classifying the scene; executing a second neural network that is configured to determine a second set of inferences associated with determining degree of freedom information for the objects in the scene; and synthesizing a 3D scene that corresponds to the scene included in the 2D image using the first set of inferences provided by the first neural network and the second set of inferences provided by the second neural network.

In accordance with certain embodiments, a computer program product is provided for synthesizing a 3D scene, the computer program product comprising a non-transitory computer-readable medium including codes for causing a computer to: access a 2D image comprising a scene; execute a first neural network that is configured to determine a first set of inferences associated with detecting objects in the scene and classifying the scene; execute a second neural network that is configured to determine a second set of inferences associated with determining degree of freedom information for the objects in the scene; and synthesize a 3D scene that corresponds to the scene included in the 2D image using the first set of inferences provided by the first neural network and the second set of inferences provided by the second neural network.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or may comprise a mixture of both hardware and software elements. Thus, while the description herein may describe certain embodiments, features, or components as being implemented in software or hardware, it should be recognized that any embodiment, feature, or component that is described in the present disclosure may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid state memory, a magnetic tape, a removable computer diskette, a random access memory (RAM), a read-only memory (ROM), a rigid magnetic disk, an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including, but not limited to, keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

FIG. 1 is an exemplary system 100 according to certain embodiments. In this exemplary system 100, a scene generation system 150 can be stored on, and executed by, one or more servers 120. The scene generation system 150 comprises one or more images 130, an image analysis component 140, a 3D scene synthesizer 160, one or more synthesized 3D scenes 170, and one or more 3D applications 180. The scene generation system 150 and/or one or more servers 120 are in communication with one or more computing devices 110 over a network 190.

Generally speaking, the scene generation system 150 can be configured to perform any and all functions described herein with respect to analyzing images 130, extracting information from images 130, generating synthesized 3D scenes 170, and/or incorporating synthesized 3D scenes into 3D applications 180. For example, the scene generation system 150 can be configured to receive images 130 (e.g., which may correspond to monocular images and/or 2D images), and to generate synthesized 3D scenes 170 corresponding to the images 130. In certain embodiments, the scene generation system 150 generates the synthesized 3D scenes 170 without relying on, or otherwise utilizing, depth information and/or depth images. The synthesized 3D scenes 170 generated can be integrated into various types of 3D applications 180 (e.g., applications associated virtual reality, robot navigation, interior design, computer vision, etc.).

The scene generation system 150 can be configured to generate synthesized 3D scenes 170 for any type of indoor scene. This can include, but is not limited to, generating synthesized 3D scenes 170 corresponding to rooms located within a residential building, a commercial building, an industrial building, and/or other types of buildings or structures. For example, in response to receiving an image 130 corresponding to a bedroom that includes various furniture items (e.g., a bed, a dresser, a nightstand, etc.), the scene generation system 150 can generate a synthesized 3D scene 170 corresponding to the image 130 of the bedroom (e.g., that includes a 3D rendering of the bedroom showing placement of the furniture items according to the layout or floorplan in the image). As another example, in response to receiving an image 130 corresponding to a bathroom that includes various household fixtures (e.g., a sink, a bathtub, a toilet, etc.), the scene generation system 150 can generate a synthesized 3D scene 170 corresponding to the image 130 of the bathroom (e.g., that includes a 3D rendering of the bathroom showing placement of the fixtures according to the layout or floorplan in the image). As a further example, in response to receiving an image 130 corresponding to a room of a manufacturing facility that includes various equipment and/or office items (e.g., a conveyor belt, a desk, a computer, etc.), the scene generation system 150 can generate a synthesized 3D scene 170 corresponding to the image 130 of the room (e.g., that includes a 3D rendering of the room showing placement of the equipment and/or office items according to the layout or floorplan in the image).

In certain embodiments, the scene generation system 150 can additionally, or alternatively, be configured to generate synthesized 3D scenes 170 for various outdoors scenes. For example, the images 130 received by the scene generation system 150 can be utilized to generate synthesized 3D scenes 170 corresponding to parks, parking lots, driveways, yards, streets, buildings (e.g., residential, commercial, and/or industrial buildings), etc.

The images 130 can be transmitted to and/or retrieved by the scene generation system 150. The scene generation system 150 can store the images 130 (e.g., in a database). The images 130 may represent digital representations corresponding to photographs, pictures, sketches, drawings, and/or the like. The images 130 may initially be captured by recording light or other electromagnetic radiation electronically (e.g., using one or more image sensors) or chemically (e.g., using light-sensitive materials or films). Any images 130 that are not originally created in a digital format can be converted to a digital format using appropriate conversion devices (e.g., image scanners and optical scanners).

In certain embodiments, the images 130 can represent 2D images and/or monocular RGB (red-green-blue) images. Because the techniques described herein do not require depth information to generate synthesized 3D scenes 170, the images 130 are not required to include depth information and/or comprise depth images. However, in certain embodiments, such depth information and/or depth images, if available, may be utilized to supplement the techniques described herein.

The image analysis component 140 can be configured to perform functions associated with analyzing the images 130 and/or extracting information from the images 130. Generally speaking, the image analysis component 140 can extract any type of information from the images 130 that can be used to generate synthesized 3D scenes 170 from the images 130. For example, the image analysis component 140 can be configured to extract information for identifying and detecting objects (e.g., desks, beds, toilets, manufacturing equipment, persons, animals, pets, household applications, fixtures, vehicles, and/or any other objects) in the images 130, identifying scenes, classifying objects and scenes captured in the images 130, and determining degree of freedom (DOF) information for objects captured in the images 130.

Figure 2:
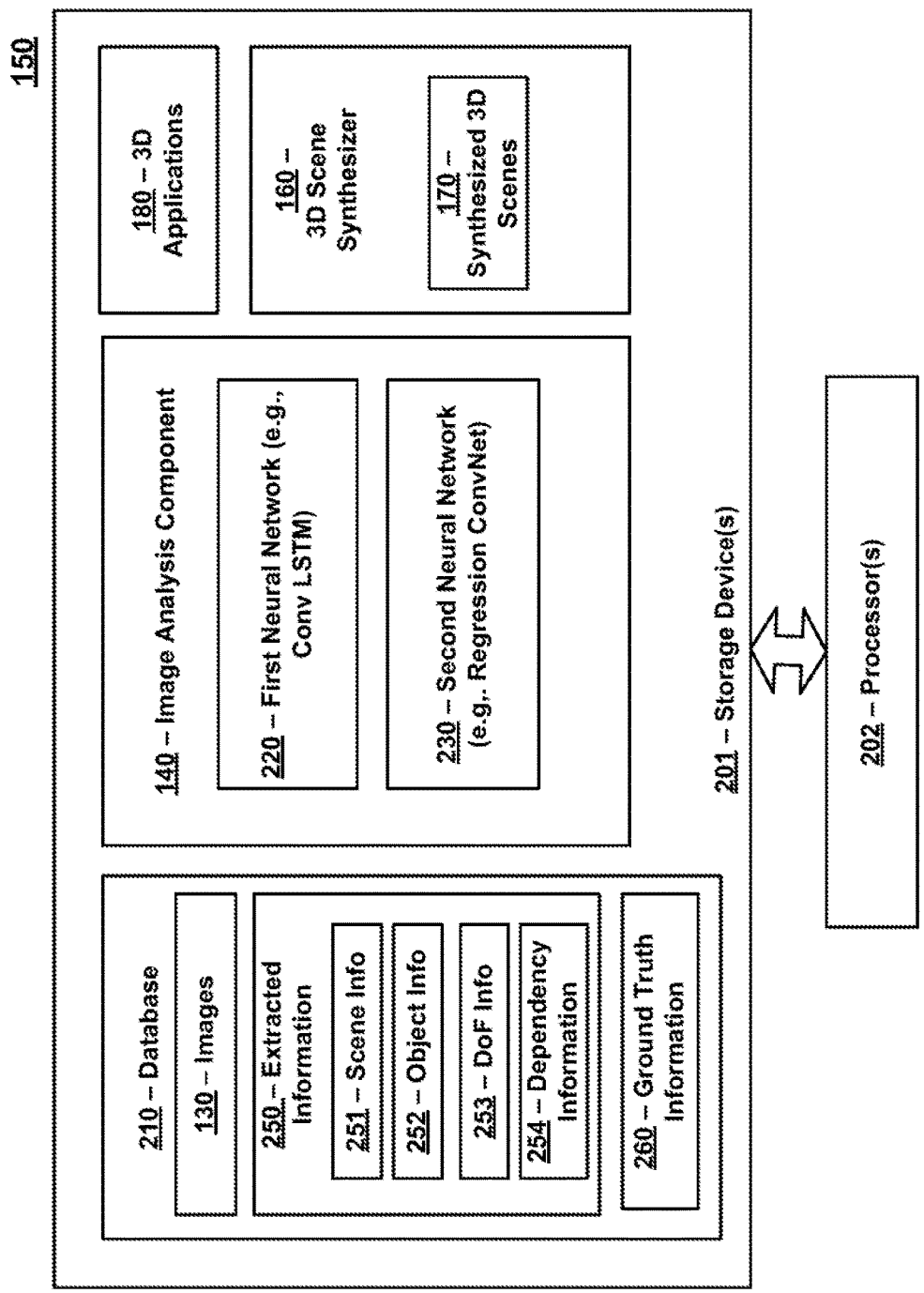
FIG. 2 is a block diagram of an exemplary scene generation system in accordance with certain embodiments.

The image analysis component 140 can further be configured to extract and/or determine inter-object and object-scene dependency information (e.g., such as dependency information 254 in FIG. 2). This dependency information extracted from training images can include data associated with spatial dependencies between objects in the images 130, as well as relationships between objects and the scene. As explained in further detail below, this dependency information can be very useful for analyzing a scene captured in an image 130 and generating a synthesized 3D image 170. The dependency information can initially be extracted by the image analysis component 140 during a training phase that enables the image analysis component 140 to learn and use the inter-object and object-scene dependency information. In certain embodiments, the dependency information can also be extracted from images 130 during testing and operational phases (e.g., to enable the image analysis component 140 to refine and/or update the learned dependency information).

As discussed in further detail below, the image analysis component 140 can utilize a neural network architecture comprising one or more neural networks to analyze, extract, and/or infer information from the images 130. For example, in certain embodiments, the image analysis component 140 can include a first neural network that is configured to extract information from the images 130 (e.g., including, inter alia, the dependency information), detect objects in the scenes captured in the images 130, and classify both the objects and the scenes. The image analysis component 140 can also include a second neural network that is configured to estimate and/or calculate DOF information for the objects in the scenes. During an initial training phase, both the first and second neural networks can be trained, at least in part, using a set of training images (e.g., which may be included in the images 130) that are annotated or associated with ground truth information (e.g., which can include information identifying objects in an image, a scene associated with the an image, DOF information associated with objects in an image, etc.).

The 3D scene synthesizer 160 can be configured to perform any functions associated with generating, synthesizing, and/or creating the synthesized 3D scenes 170. The 3D scene synthesizer 160 may utilize any information produced by the image analysis component 140 to create the synthesized 3D scenes 170. For example, in certain embodiments, the information and inferences produced and/or generated by the first and second neural networks can be utilized jointly to create the synthesized 3D scenes 170. The manner in which the synthesized 3D scenes 170 are created and/or rendered can vary. In certain embodiments, the 3D scene synthesizer 160 can utilize one or more 3D models (e.g., 3D models of a room or other location having specific dimensions) to assist with the creation of the synthesized 3D scenes 170. Objects can be inserted into the 3D models according to the object parameters (e.g., dimensions, location, pose, DOF values, object labels, etc.) that are derived by the image analysis component 140. In certain embodiments, the 3D scene synthesizer 160 can utilize the Three.js JavaScript library and/or WebGL (Web Graphics Library) to assist with generating the synthesized 3D scenes 170. Other types of 3D creation tools can also be used to create the synthesized 3D scenes 170.

The synthesized 3D scenes 170 can generally represent any type of 3D representation, 3D rendering, 3D image, digital 3D environment, and/or the like. The synthesized 3D scenes 170 can be derived from, and correspond to, scenes that are captured in the images 130 (e.g., 2D images and/or monocular images). As described above, the type and content of the synthesized 3D scenes 170 can vary greatly. For example, the synthesized 3D scenes 170 can correspond to any indoor and/or outdoor environment. In certain embodiments, the synthesized 3D scenes 170 can include 3D representations corresponding to rooms or locations included inside of enclosed structures (e.g., houses, restaurants, offices, manufacturing plants, residential buildings, commercial buildings, industrial buildings, garages, sheds, etc.). In certain embodiments, the synthesized 3D scenes 170 can also include 3D representations corresponding to outdoor locations (e.g., parks, streets, landmarks, backyards, playgrounds, etc.).

In certain embodiments, the synthesized 3D scenes 170 can be generated to include one or more objects corresponding to objects that are captured in the images 130. Generally speaking, any type of object may be inserted into the synthesized 3D scenes 170. For example, a synthesized 3D scene 170 for a bedroom may include objects corresponding to a bed, dresser, and/or other bedroom objects captured in a corresponding image 130 utilized to create the synthesized 3D scene 170. Likewise, a synthesized 3D scene 170 for a playground may include objects corresponding to a swing set, a basketball hoop, sports equipment, etc. The type of objects inserted into the synthesized 3D scene 170 can vary greatly based on the scene associated with a corresponding image 130 and/or based on the objects detected in a corresponding image 130. Any synthesized 3D scenes 170 created, or otherwise used, by the scene generation system 150 can be stored in one or more databases (e.g., database 210 in FIG. 2).

In certain embodiments, the synthesized 3D scenes 170, and functionality provided by the scene generation system 150, can be utilized in connection with, and/or integrated with, various types of 3D applications 180. The 3D applications 180 can be executed by, or otherwise associated with, various types of devices and apparatuses (e.g., computing devices 110, specialized robots, virtual reality equipment, etc.).

In one exemplary embodiment, the 3D applications 180 can include applications associated with providing virtual reality experiences. For example, the synthesized 3D scenes 170 can be utilized to create virtual reality content for games, training, education, entertainment, and/or other purposes. In another exemplary embodiment, the 3D applications 180 can include applications for intelligent robots or devices. For example, intelligent robots can be configured to perform various functions (e.g., vacuum functions, manufacturing functions, assembly line functions, etc.), and integrating the synthesized 3D scenes 170 into these intelligent robot systems can assist the robots with navigating around a particular room, location, and/or environment. In another exemplary embodiment, the 3D applications 180 can include applications that assist with interior design. For example, the synthesized 3D scenes 170 can be integrated into a digital design application that assists designers or customers with planning a layout for a room or location (e.g., that enables designers to visualize placement of furniture, wall-mounted picture frames, etc.). In another exemplary embodiment, the 3D applications 180 can include applications associated with surveillance systems and/or visibility analysis systems. For example, the synthesized 3D scenes 170 can be integrated into a surveillance system or visibility analysis system to determine an optimal placement of surveillance cameras and/or other objects. In a further exemplary embodiment, the 3D applications 180 can include applications associated with providing holograms. For example, the synthesized 3D scenes 170 can be utilized to generate and/or render holograms. The 3D applications 180 can include many other types of applications, and can be utilized by various devices, apparatuses, equipment, robots, and/or systems.

The queries and/or requests to generate synthesized 3D scenes 170 from the images 130 can be submitted directly to the scene generation system 150 (e.g., via one or more input devices attached to the one or more servers 120 hosting the scene generation system 150). The requests can additionally, or alternatively, be submitted by one or more computing devices 110. For example, as shown in FIG. 1, a plurality of computing devices 110 may be connected to the scene generation system 150 to enable remote individuals to access the scene generation system 150 over a network 190. The servers 120 and/or computing devices 110 may present information, functions, and/or interfaces (e.g., graphical user interfaces) that enable individuals to provide the images 130, submit requests to generate 3D synthesized scenes 170, view the synthesized 3D scenes 170, edit the synthesized 3D scenes 170 (e.g., adding, editing, deleting, and/or moving objects in the scenes), store the synthesized 3D scenes 170, manage access to the synthesized 3D scenes 170, integrate the synthesized 3D scenes 170 into 3D applications 180, and/or perform other related functions.

In certain embodiments, the computing devices 110 may represent desktop computers, laptop computers, mobile devices (e.g., smart phones, personal digital assistants, tablet devices, vehicular computing devices, or any other device that is mobile in nature), and/or other types of computing devices. In certain embodiments, the scene generation system 150 is stored on one or more servers 120. The one or more servers 120 may generally represent any type of computing device, including any of the computing devices 110 mentioned above. In certain embodiments, the one or more servers 120 comprise one or more mainframe computing devices that execute web servers capable of communicating with the computing devices 110 and/or other devices over the network 190. The network 190 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1, including the computing devices 110 and servers 120, can be configured to communicate directly with each other and/or over the network 190 via wired or wireless communication links, or a combination of the two. The computing devices 110 and servers 120 can also be equipped with one or more transceiver devices, one or more computer storage devices (e.g., RAM, ROM, PROM, SRAM, etc.) and one or more processing devices (e.g., a central processing unit) that are capable of executing computer program instructions. The computer storage devices can be physical, non-transitory mediums.

FIG. 2 is a block diagram of an exemplary scene generation system 150 in accordance with certain embodiments of the present invention. The scene generation system 150 includes one or more storage devices 201 that are in communication with one or more processors 202. The one or more storage devices 201 can include: i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage devices 201 can comprise (i) non-transitory memory and/or (ii) transitory memory. The one or more processors 202 can include one or more central processing units (CPUs), controllers, microprocessors, digital signal processors, and/or computational circuits. The one or more storage devices 201 store, inter alia, data and instructions associated with one or more databases 210, an image analysis component 140, a first neural network 220, a second neural network 230, a 3D scene synthesizer 160, and one or more 3D applications 180. The one or more processors 202 are configured to execute instructions associated with these components, and any other components, that are stored on the one or more storage devices 201. Each of these components is described in further detail below.

The database 210 stores a plurality of images 130, extracted information 250, and/or ground truth information 260. The images 130 can include both training images (e.g., that are annotated or augmented with ground truth information 260) and images that are used during testing or operational phases. The extracted information 250 may generally include any information and/or data that can be extracted from the images 130 including, but not limited to, scene information 251, object information 252, degree of freedom (DOF) information 253, and dependency information 254.

The scene information 251 can include any data associated with detecting, identifying, and/or classifying a scene captured in an image 130. The scene information 251 may indicate that a scene captured in an image 130 corresponds to a particular type of indoor location or outdoor location. For example, exemplary scene information 251 may indicate that an image 130 corresponds to a scene associated with a bedroom, bathroom, yard, garage, etc.

The object information 252 can include any data associated with detecting, identifying, and/or classifying an object captured in an image 130. The object information 252 may indicate that a scene captured in an image 130 includes a specific type of object. Nearly any type of object can be included in the scene captured in an image 130. For example, exemplary object information 252 may indicate that an image 130 includes objects corresponding to various types of inanimate articles (e.g., beds, desks, windows, tools, appliances, industrial equipment, curtains, sporting equipment, fixtures, vehicles, etc.), living things (e.g., human beings, animals, etc.), structures (e.g., buildings, landmarks, etc.), and/or the like. The object information 252 can also include data indicating parameters (e.g., dimensions, coordinates, locations, etc.) associated with the objects.

The DOF information 253 can include any data associated with detecting, determining, estimating, and/or measuring degree of freedom data associated with objects in images 130 and/or any other data associated with the movement capabilities of objects captured in images 130. In certain embodiments, the DOF information 253 can include six degrees of freedom (6-DOF) information, or a portion thereof, associated with the objects. This 6-DOF information can be used to indicate the freedom of movement of an object in a 3D space. The DOF information 253 can be useful for placing the objects in a 3D space during the generation of the synthesized 3D scenes 170.

The dependency information 254 can include any data associated with detecting, determining, estimating, and/or indicating the relationships among objects in the images 130 and/or relationships among objects and scenes. For example, the dependency information 254 can include inter-object dependency information that indicates the spatial dependencies or relationships between objects included in an image 130. Likewise, the dependency information 254 can also include object-scene dependency information that indicates relationships between objects in a scene and the scene itself. The dependency information 254 can be learned during a training phase (e.g., using training images that include ground truth information 260).

The dependency information 254 can be very useful for analyzing a scene captured in an image 130. For example, given an image of a bedroom, the detection of an object corresponding to a "bed" can increase the probability that a "nightstand" will be detected in neighboring locations adjacent to the bed. Likewise, the fact that a scene captured in an image 130 corresponds to a bedroom increases the probability that the scene will include objects corresponding to a bed, nightstand, dresser, and/or other common bedroom items. Thus, the inter-object and object-scene relations captured in the dependency information 254 can be used in various ways to analyze the image 130 (e.g., to detect and classify both objects and scenes, to ascertain object parameters, etc.) and to generate a synthesized 3D scene 170 corresponding to the image 130.

As mentioned above, the image analysis component 140 can be configured to perform various functions associated with analyzing the images 130 and/or extracting information from the images 130. This can include functions associated with generating, identifying, and/or detecting the aforementioned extracted information 250, such as the scene information 251, object information 252, DOF information 253, and dependency information 254. The image analysis component 140 can include one or more neural networks (e.g., such as the first neural network 220 and the second neural network 230) for determining and/or utilizing the extracted information 250.

In certain embodiments, a first neural network 220 can be configured to provide inferences and/or determinations on various scene understanding tasks, including tasks associated with detecting objects and classifying both objects and scenes. For example, the first neural network 220 can be configured to perform any or all of the following tasks: detecting objects and scenes, classifying objects and scenes, capturing dependencies and relationships among objects and scenes (e.g., such as inter-object and object-scene dependency information), mapping objects in a scene to semantic object labels and semantic scene labels, and/or other related functions. Performance of some or all of these tasks and/or other tasks can involve extracting and/or utilizing the scene information 251, object information 252, and/or dependency information 254. In certain embodiments, a second neural network 230 can be configured to provide inferences and/or determinations for various scene understanding tasks, including tasks associated with estimating and/or determining DOF information 253 associated with objects detected in the images 130. The inferences and/or determinations provided by the first neural network 220 and the second neural network 230 can be jointly used to synthesize and/or generate the synthesized 3D scenes 170.

The configurations of the first neural network 220 and the second neural network 230 can vary. In certain embodiments, both the first neural network 220 and the second neural network 230 can be implemented, at least in part, using a convolutional neural network (CNN). For example, in certain embodiments, the first neural network 220 can be implemented as a convolutional long short-term memory (Conv LSTM). The Conv LSTM can include a LSTM structure that integrates the CNN with a recurrent neural network. In certain embodiments, the second neural network 230 can be implemented as a regression convolutional neural network (regression ConvNet).

The first neural network 220 and the second neural network 230 can be trained utilizing images 130 that include, or are associated with, ground truth information 260. The ground truth information 260 can generally include any information that can assist the first neural network 220 and/or the second neural network 230 with performing scene understanding tasks including, but not limited to, tasks such as detecting objects and scenes, classifying objects and scenes, and/or determining DOF information for objects. In certain embodiments, the ground truth information 260 can include annotations, information, and/or data that identify object segments in the scenes that are captured in a set of training images included in the images 130 stored on the scene generation system. The object segments can be used to identify the objects in the scenes, and can be augmented with various data pertaining to the objects (e.g., dimensions, DOF information, position information, semantic labels, etc.). The ground truth information 260 can also include information that identifies the scenes and/or provides other information relating to the scenes (e.g., semantic labels, and dimensions of a room, floorplan, or layout corresponding to a scene).

The type of ground truth information 260 utilized to train the first neural network 220 and second neural network 230 can vary. In certain embodiments, the ground truth information 260 can include any or all of the following: DOF values for objects in images 130; dimensions for objects in images 130; bounding boxes that identify boundaries of the objects in images 130; location information for objects in images 130 (e.g., which may identify the 3D coordinates of the objects in a 3D space or the location of the object on a floorplan or layout); yaw, pitch, and roll data for objects in the images 130; information indicating poses, positions, and orientation of objects in the images 130; object and scene identifiers and/or classifications; semantic labels associated with objects and scenes; dimension and contour information for scenes; and/or other types of data describing the objects and/or scenes.

In certain embodiments, the ground truth information 260, at least in part, permits the dependency information 254 to be learned by the image analysis component 140 during a training phase or stage. For example, the first neural network 220 of the image analysis component 140 can include an LSTM structure that captures the dependency information 254 during training. This knowledge can then be utilized by the first neural network 220, or other component of the image analysis component 140, to perform scene understanding tasks (e.g., relating to classifying/detecting objects and scenes).

In certain embodiments, the first neural network 220 and the second neural network 230 can be trained separately. The training of the first neural network 220 can include, inter alia, mapping pixels of object segments identified in the ground truth information 260 to both semantic object labels and semantic scene labels, and utilizing a recurrent unit of the first neural network 220 to capture and learn dependency information 254 (including inter-object dependency information and object-scene dependency information). The training of the second neural network 230 can include, inter alia, mapping pixels of object segments identified in the ground truth information 260 to values that describe an object's pose, position, and dimension within a 3D space. Further details regarding exemplary training techniques for both the first neural network 220 and the second neural network 230 are discussed below with respect to FIG. 3.

Exemplary embodiments of the scene generation system 150 and the aforementioned sub-components (e.g., the database 210, image analysis component 140, first neural network 220, second neural network 230, 3D scene synthesizer 160, and 3D applications 180) are described in further detail below. While the sub-components of the scene generation system 150 may be depicted in FIGS. 1 and 2 as being distinct or separate from one other, it should be recognized that this distinction may be a logical distinction rather than a physical distinction. Any or all of the sub-components can be combined with one another to perform the functions described herein, and any aspect or feature that is described as being performed by one sub-component can be performed by any or all of the other sub-components. Also, while the sub-components of the scene generation system 150 may be illustrated as being implemented in software in certain portions of this disclosure, it should be recognized that the sub-components described herein may be implemented in hardware and/or software.

Figure 3:
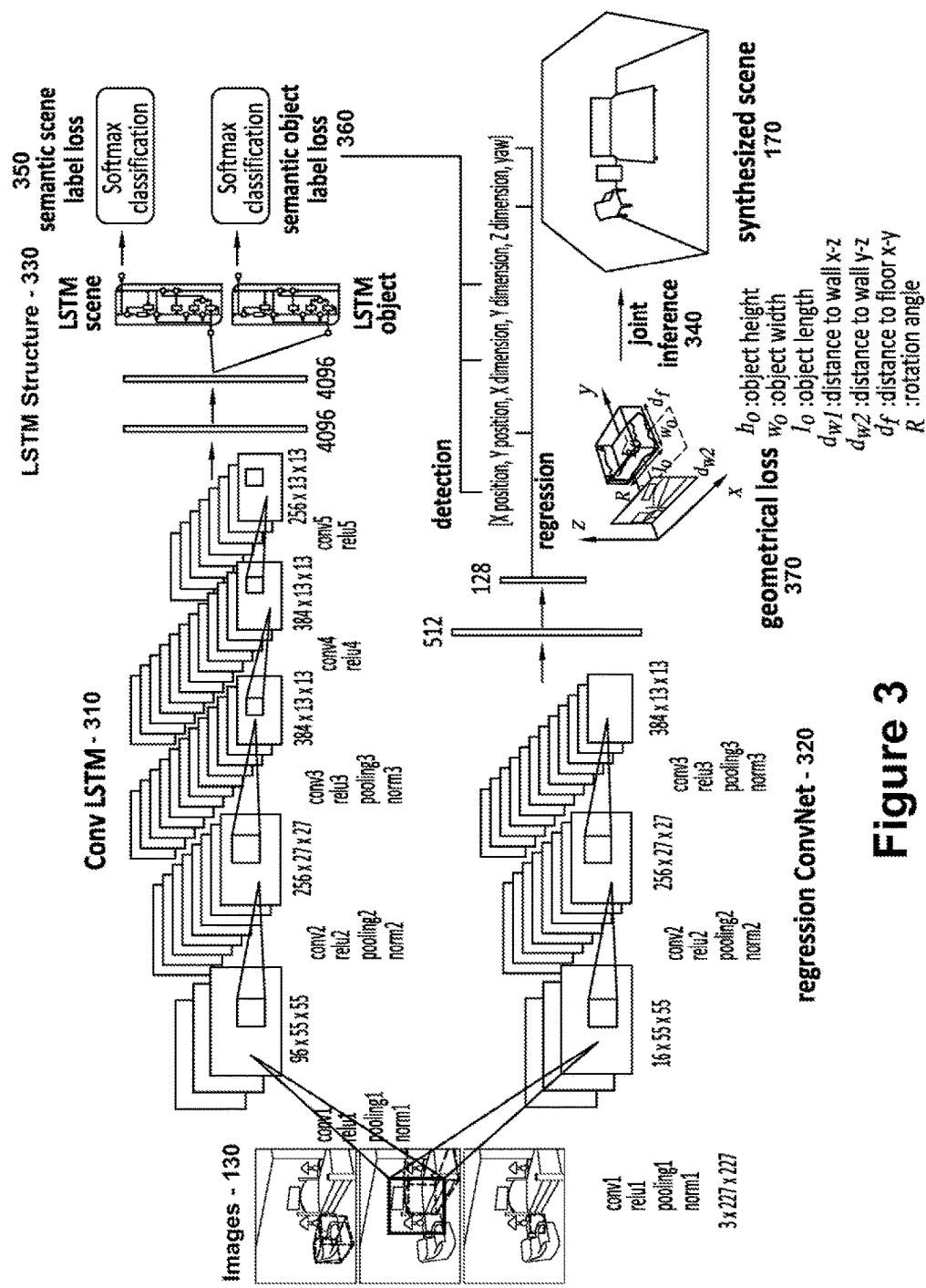
FIG. 3 is a diagram illustrating an exemplary architecture for a scene generation system in accordance with certain embodiments.

FIG. 3 is a diagram illustrating an exemplary architecture 300 for a scene generation system 150 in accordance with certain embodiments. The exemplary architecture 300 illustrates, inter alia, underlying configurations for the first neural network 220 (e.g., which may be implemented as a Conv LSTM 310) and the second neural network 230 (e.g., which may be implemented as a regression ConvNet 320), and how the first neural network 220 and the second neural network 230 cooperate to produce joint inferences 340 that can be utilized to construct a synthesized 3D scene 170.

The images 130 on the left side of the figure can include a set of training images that are annotated with ground truth information 260, which is utilized for training the Conv LSTM network 310 and the regression ConvNet network 320. The Conv LSTM network 310 includes a CNN that is connected to an LSTM structure 330 that comprises two LSTM modules. The two LSTM modules can compute a Softmax output for each LSTM hidden layer value in order to obtain a semantic scene label loss 350 and a semantic object label loss 360. The regression ConvNet 320 can be trained using a geometric loss 370, which measures the correctness between ground truth DOF values and regression values obtained by the regression ConvNet 320. The Conv LSTM 310 and regression ConvNet 320 jointly provide inferences 340 for objects' poses, positions, and dimensions in a 3D space. These inferences 340 are utilized to generate a 3D scene 170 that agrees with the floor plan of a query image 130 (e.g., a 2D and/or monocular image).

Once trained, the Conv LSTM 310 and regression ConvNet 320 are configured to provide inferences 340 on images 130 without ground truth information 260. The inferences 340 from the Conv LSTM 310 and regression ConvNet 320 can be utilized for implementing various scene understanding tasks, including scene/object classification, object detection, and object DOF estimation. In certain embodiments, the Conv LSTM 310 and regression ConvNet 320 can be configured to perform these scene understanding tasks for indoor scenes (e.g., corresponding bedrooms, bathrooms, and/or other indoor scenes). The Conv LSTM 310 and regression ConvNet 320 can additionally, or alternatively, be configured to perform these scene understanding tasks for outdoor scenes in certain embodiments.

Utilizing the ground truth information 260 comprising object segment annotations in the images 130, the Conv LSTM network 310 integrates a CNN to a recurrent neural network with the LSTM structure 330. The CNN can take pixels of image regions as inputs at a low level, and passes high-dimensional vectors that represent either an object within a scene image or a holistic scene image to the LSTM structure 330. As an improvement over a pure CNN model, the memory unit of LSTM structure 330 can capture dependency information 254, including information related to inter-object spatial context and object-scene dependencies.

Both semantic object label loss 360 and semantic scene label loss 350 that measure the label consistencies of both scenes and objects can be utilized for governing the optimization of Conv LSTM 310. The 3D geometric loss 370 is utilized for training the regression ConvNet 320, which maps pixels from ground truth object regions to continuous values that describe an object's pose, position, and dimension within a 3D space.

Conv LSTM

This section describes an exemplary technique that may be utilized for implementing the Conv LSTM 310.

Let $(g=G_1, G_2, \ldots G_K)$ be the K ground truth objects within a scene image I. A typical region-based CNN (R-CNN) can be used to feed both the ground truth segments g and the holistic scene image I into the CNN structure 330, where each holistic scene image I is considered as an object region. A CNN architecture can be used that follows Alex-Net, and the pre-trained network weights up to the 7th fully connected layer are used as initial weights for training the network. In certain embodiments, the 2012 ImageNet Large Scale Visual Recognition Challenge (ILSVRC-2012) dataset, or similar dataset, can be used for training. When directly fine-tuning the CNN with ground truth objects and scenes, the network is capable of providing segment-level inferences to query object proposals within a scene image. The LSTM structure 330 can be built on the top of ground truth object segments so that the objects' spatial context along with object-scene dependencies can be learned.

In a general form of a recurrent CNN (R-CNN), the features of a set of object regions can be denoted as $X=\{x_1 x_2, \ldots, x_I\}$, where $x_i = f_{W_{CNN}}(G_i)$ represents each output of R-CNN when inputting an object region $G_i$ to the network. The LSTM structure 330 receives and considers CNN features of all objects X within the same scene as inputs that span various "time-steps" of the recurrent unit. Specifically, a memory cell of LSTM structure 330 contains four main components, including an input gate, a self-recurrent neuron, a forget gate and an output gate. When each ground truth object region reaches the LSTM structure 330 through the R-CNN, the activation at the LSTM's input gate, the candidate value $\hat{C}_t$ and the activation at the memory cell of LSTM can be computed as:

$$I_i = \sigma(W_{in} x_i + U_i h_{i-1} + b_i),$$

$$\hat{C}_i = \tan h(W_c x_i + U_c h_{i-1} + b_c),$$

$$f_i = \sigma(W_f x_i + U_f h_{i-1} + b_f), \quad (1)$$

where:
$I_i$ is the state output at time t;
$\sigma(\ )$ is a sigmoid function;
$W_{in}$ denotes the weight parameters of the input gate;
$x_i$ is the input vector to the LSTM unit or structure;
$h_{i-1}$ is the hidden state of the previous time-step;
$U_i$ denotes the weigh parameters for the previous hidden state $h_{i-1}$;
$b_i$ denotes the bias vector parameters of the input gate;
$\hat{C}_i$ denotes the candidate value;
tan h( ) is the hyperbolic tangent function;
$W_c$ denotes the weight parameters of the cell state;
$x_t$ is a signal vector of current state;
$U_c$ denotes the weight parameters for the cell state;
$b_c$ denotes the bias vector parameters of the cell state;
$f_i$ is the activation vector at the forget gate;
$W_f$ denotes the weight parameters of the forget gate;
$U_f$ denotes the weight parameters for the cell state of the previous time-step; and
$b_f$ denotes the bias vector parameters of the forget gate.

The $\sigma(\cdot)$ can represent a sigmoid layer that determines how much information is going through this layer and outputs values $O_o \in (0, 1]$, and the tan h($\cdot$) layer outputs values $O_{tan\ h} \in (-1, 1)$. The forget gate determines the new cell state $C_t$ by deciding how much information of another segment $S_{i \neq i}$ should be forgotten. Given the values of the input gate activation $i_t$, the forget gate activation $f_i$ and the candidate value $\hat{C}_t$, the new cell state $C_i$ can be obtained using:

$$C_i = f_i * C_{i-1} + I_i * \hat{C}_i \quad (2)$$

where:
$C_i$ denotes the cell state vector;
$f_i$ is the activation vector at the forget gate;
$C_{i-1}$ denotes the cell state vector at the previous time-step;
$\hat{C}_i$ denotes the candidate value; and
$I_i$ is the state output at time t.

The output gate value $O_i$ can then be obtained based on the CNN end output $x_i$, the hidden layer value $h_{i-1}$ obtained from another segment entry, and the updated cell state value $C_i$ through:

$$o_i = \sigma(W_o x_i + U_o h_{i-1} + V_o C_i + b_o), \quad (3)$$

where:
$o_i$ is the activation vector of the output gate;
$\sigma(\ )$ is a sigmoid function;
$W_o$ denotes the weight parameters of the output gate;
$x_i$; is an input vector to the LSTM unit or structure;
$U_o$ denotes the weight parameters for the output state;
$h_{i-1}$ is the hidden state of the previous time-step;
$V_o$ denotes the weight parameters of the output signals;
$C_i$ denotes the cell state vector; and
$b_f$ denotes the bias vector parameters of the output gate.

The new hidden layer value $h_t$ can be computed using:

$$h_i = o_i * \tan h(C_i), \quad (4)$$

where:
$h_i$ is the hidden state of the time-step t;
$o_i$ is the activation vector of the output gate;
tan h( ) is the hyperbolic tangent function; and
$C_i$ denotes the cell state vector.

In the above equations, $W_i$, $W_c$, $W_f$, $W_o$, $U_I$, $U_c$, $U_f$, $U_o$ and $V_o$ are weight parameters of the model, and $b_i$, $b_f$, $b_c$ and $b_o$ are bias vectors. These weight and bias parameters, together with the weight and bias parameters in the CNN model, can be learned by performing end-to-end optimization between both object and scene labels using backpropagation-based stochastic gradient descent.

In addition to the inter-object spatial context, the learning of the Conv LSTM 310 also considers the object-scene relation. To achieve this, the scene image in which the objects are located can be considered as an additional image region, and it can be added to the last "time-step" entry of the LSTM structure 330. The hidden layer values of object regions are extracted from LSTM through a linear transformation $\hat{y}_i = W_z h_i + b_z$, where $W_z$ and $b_z$ are learnable network parameters. The output of each LSTM "time-step" can be used for computing the semantic object label loss and the semantic scene label loss. The last "time-step" output can be considered as the scene representation because it includes information on both local object regions and the holistic scene. Both object and scene label consistencies can be measured with the cross entropy losses:

$$L_{total} = L_{object}(p_o, \hat{P}_o) + L_{scene}(p_I, \hat{p}_I) = -\Sigma_{i=\{o,I\}}[\log \hat{p}_i + (1-p_i)\log(1-\hat{p}_i)] \quad (5)$$

where:

$L_{total}$ denotes the total loss;
$L_{object}$ denotes the object loss;
$L_{scene}$ denotes the scene loss;
$p_o$ denotes the ground truth object category;
$\hat{P}_o$ denotes the predicted object category;
$p_I$ denotes the ground truth scene category; and
$\hat{p}_I$ denotes the predicted scene category.

The $\hat{p}$ can be obtained by passing 9 through a Softmax function, and p is the one hot vector that represents the ground truth label of an instance.

As illustrated in FIG. 3, objects within the same scene image can be fed into the same unit of LSTM structure 330 at different "time-step" entries. Benefiting from the internal state module of LSTM, spatial dependencies between objects and dependencies between objects and the scene category can be fully explored when optimizing the network.

The data that is utilized to train R-CNN (including the LSTM) are generally presented in sequential forms. However, the objects' spatial dependencies may not naturally possess the sequential knowledge. For example, when a "night stand" and a "bed" both exist in a scene image, equally mutual dependencies can be expected between the "night stand" and the "bed", because the existence of either object can increase the probability of the counterpart's existence within the same scene. Thus, simply formulating spatial object regions in a "sequential" form can result in unbalanced dependencies between objects. Instead, when learning the Conv LSTM 310, object segments can be formulated in multiple sequential orders for each scene image by feeding objects to Conv LSTM 310 in random input orders. As a result, multiple training "sequences" can represent an identical scene image, where objects included in each "sequence" are placed with random permutation in the training set.

In the testing or operational stage, a set of segment proposals can be generated following the same strategy as in the training stage. These segment proposals along with the scene image can be fed into the Conv LSTM network 310. The scene category can be determined based on the scene image I by computing the probability $P(\hat{y}=c|I)$ that the scene belongs to category c through the output of the Softmax layer. Similarly, object detection can be achieved by ranking segment proposals' output scores.

Regression ConvNet

This section describes an exemplary technique that may be utilized for implementing the regression ConvNet 320.

Six degrees of freedom (6-DOF) information can be used to indicate the movement of a rigid object in 3-dimensional space. When dealing with the problem of placing an object in the 3D space, both the dimensions of the object and the 6-DOF information can be considered. Thus, the degrees of freedom for each object can be parametrized as $(p_x, p_y, p_z, d_x, d_y, d_z, \text{roll}, \text{pitch}, \text{yaw})$, where the first three variables indicate object's 3D translations from a zero point, the middle three variables are an object's 3D dimensions, and the last three variables indicate the objects' rotations against each axis. Reasonable constraints can be applied to simplify the problem. Specifically, the candidate object can be restricted to be selected from a reduced number of object categories (e.g., such as bed and table) that can only be placed on the floor $p_z=0$. Because objects from these categories are unlikely to rotate against certain axes, constraints can be placed that only allow the object to rotate against the z-axis (yaw), and correspondingly ignore the roll and pitch values. As a result, the remaining parameters that need to be estimated for determining an objects' placement into a 3D space form a 6-dimensional vector $(p_x, p_y, d_x, d_y, d_z, \text{yaw})$, among which $p_x$, $d_x$ and $d_y$ can be inferred from 2D object detection results if it is assumed the image plane is parallel to the x-z plane. Thus, the regression ConvNet 320 can be used to estimate $(p_y, d_z, \text{yaw})$.

The regression ConvNet 320 can be trained using annotations on both ground truth object segments, as well as segment proposals obtained from an unsupervised object segmentation method constrained parametric min-cut (CPMC). For the latter, corresponding depth channels can be used to compute the annotations in the training stage. In the testing or operational stage, only RGB channels of object segment proposals may be utilized as inputs to the regression ConvNet 320 for pose and position estimation. Empirically, the commonly used least square loss can be highly sensitive to outliers, and in this case outliers can be easily observed. Therefore, a robust square loss instead can be chosen for training the regression ConvNet:

$$\mathcal{L}_{pose}(q_i, \hat{q}_i) = \begin{cases} e & \text{if } e \le 1 \\ 1 + \log e & \text{if } e > 1 \end{cases}, \quad (6)$$

where:

$L_{pose}$ denotes the pose loss;
$q_i$ denotes the ground truth pose;
$\hat{q}_i$ denotes the predicted pose; and
e is the $L_2$-distance based loss on the pose.

The error e is the $L_2$-distance $\|q_i - \hat{q}_i\|_2$ between the ground truth annotations $q_i$ and the estimated pose and position variables $\hat{q}_i$ of object i. Because the relations between objects' poses and positions are not directly helpful for estimating objects' poses, the recurrent unit may not be considered when building the regression ConvNet 320. The regression ConvNet 320 can be built by applying some modifications to the AlexNet architecture, and the resulting ConvNet can follow the stream: C(11, 96, 4)→ReLU→P(2, 2)→C(5, 256, 1)→ReLU→C(3, 384, 1)→P(2, 2)→F(512)→ReLU→F(128)→ReLU. Experimental results may suggest fine-tuning a pre-trained ConvNet usually leads to a higher loss when training the regression ConvNet 320. Therefore, the ConvNet can be trained from scratch using random initial weights. This can start with an initial learning rate of 0.01 and decay the learning rate by 0.96 after every 2,000 iterations. The training can be stopped at 20,000 iterations.

Inferences

This section describes an exemplary technique that may be utilized for generating inferences that can be utilized to create the synthesized 3D scene 170.

The inference stage of this approach can start with obtaining a set of figure-ground object segments from each scene image. The CPMC can be utilized to test monocular images for obtaining independent figure-ground overlapping image partitions by solving a sequence of constrained parametric min-cut problems, while not requiring any prior information on objects' ground truth labels or locations. Suppose $S=\{S_1, S_2, \ldots, S_T\}$ is used to define T object segment proposals that are generated from an image. Each segment $S_i$ can be a binary matrix, where 0 denotes the background and 1 denotes the foreground. The candidate image segment proposals can fit the R-CNN framework, and use the network's fully-connected layer output for training object detectors. However, the problem becomes more complicated when utilizing the recurrent unit that relies on multiple object regions. In one exemplary implementation, the Conv LSTM 310 can be defined to handle a fixed number of K object segments in both training and testing/operational stages. When extracting the feature of a segment $S_i$ from the Conv LSTM 310, the remaining K−1 segment proposals that jointly affect the representation of $S_i$ can be expected to be contextually meaningful.

With efforts toward this end, a greedy approach can be applied that iteratively selects K−1 most "salient" segments from each testing scene image in an unsupervised manner. Given the set of segments in each test scene image, up to 200 figure-ground segments can be allowed in each input image by filtering out small segments and sampling from the remaining segments. Based on all these segments, a graph G=(V, E) can model pairwise relations between the vertices (segments) v∈V with edges e∈E, where the weight $w_{ij}$ assigned to each edge $e_{ij}$ is measured by the chi-squared distance $\exp(-\gamma\chi^2(v_i,v_j))$.

The problem of selecting the representative and compact segment set among all the segments in an image can be modeled as a facility location problem. It can be considered as the set of locations for opening facilities. With the constraint K−1, the combinatorial formulation of the facility location problem can be applied:

$$\max_P H(P) = \Sigma_{i \in V} \max_{j \in P} w_{ij} - \Sigma_{j \in P} \phi j \quad s.t. P \subseteq S \subseteq V, N_P \leq K-1 \quad (7)$$

where:
H denotes the overall profit;
P is a subset of object segment proposals;
V denotes the object segment hypotheses with edges;
S denotes the object segment proposals generated from an image;
$w_{ij}$ denotes the chi-squared distance between a pair of object segments;
ϕj is the cost of selecting a new segment proposal;
$N_P$ denotes the number of selected object segments; and
K is the constraint of the number of selected object segments.

In the above equation, $w_{ij}$ denotes the chi-squared distance between a group element $v_i$ (considered as clients) and a potential group center vertex $v_j$ (considered as facilities), and the cost of opening a facility is fixed to δ. Submodularity of the overall profit H has been proven.

When dealing with the object detection task, the representation of each candidate object segment may depend on the K−1 selected object regions. For extracting the representation for each object segment, the query segment can be placed at the last sequential order when feeding the set of segments into the Conv LSTM network 310. For segments that are selected as one of the K−1 segments, their existence can be ignored in earlier entries of the sequential data, and the same procedure for extracting their representations can be followed.

Object Detection

This section describes an exemplary technique that may be utilized for detecting objects.

Detecting objects from cluttered scenes with occlusions is a long-term challenging problem. One aim can be to determine whether each candidate image segment contains the object of interest among all image segment proposals. For each scene image, the CPMC can be configured to generate up to 200 object segment proposals, where each segment proposal is a binary mask in irregular shapes instead of rectangulars. An object segment $S_i$ can also be considered as recalled if its intersection-over-union (IoU) score $O(S_i,S_{gt})$ between $S_i$ and the ground-truth object region $S_{gt}$ is above 0.5, where $O(S_i,S_{gt})$ can be computed as:

$$O(S_i,S_{gt}) = \frac{|S_i \cap S_{gt}|}{|S_i \cup S_{gt}|} \quad (8)$$

where:
O( ) is the intersection-over-union (IoU) score;
$S_i$ is the mask of a candidate object segment; and
$S_{gt}$ is the mask of a ground truth object segment.

To be consistent with our training procedure, each object image region can be zero-padded with the binary mask before feeding these image regions to Conv LSTM 310. Instead of directly employing the Softmax layer output for determining the objection detection results, the hidden layer values h can be extracted from the LSTM structure 330 for all candidate object regions, and a binary classifier (e.g., a binary lib-svm classifier) can be trained for each object category using the hidden layer features. The hidden layer dimension h of both LSTM modules are empirically set as 256. For obtaining object representations of testing samples, using multiple "sequences" of objects and extracting the last "time-step" LSTM hidden layer from each object "sequence" as the representation of a candidate object segment can lead to improved performance than using a single "sequence" of objects and extracting each corresponding "time-step" outputs as an object's representation. Thus, for a scene image that contains T segment proposals, T "sequences" of objects can be generated, where each "sequence" contains K−1 segments and the segment of interest is placed at the last "time-step."

Extensive quantitative and qualitative experiments were conducted on various tasks using the NYU Depth V2 indoor dataset. For training the Conv LSTM 310, pixel-wise object labels and scene image labels were used for supervision, where all background regions were zero-padded when inputting object regions to the network. For training the regression ConvNet 320, parametrized object pose annotations were used, which include three dimensions of objects' 3D bounding boxes, 3D coordinates of bounding box centers, and yaw values that indicate objects' rotation angles against the z-axis.

The training of both the Conv LSTM 310 and the regression ConvNet 320 was performed on a NVIDIA Tesla K80 GPU with dual 12-core Intel Xeon E5-2603 CPUs, and all deep ConvNets were built using the TensorFlow library. Fine-tuning the Conv LSTM 310 with pre-trained weights using a fixed learning rate of 0.001 and the batch size of 32 converges at 5,000 iterations in approximately 2 hours, and training the regression ConvNet 320 from scratch with an adaptive learning rate up to 20,000 iterations takes roughly 5 hours.

The Conv LSTM network 310 and a regression ConvNet 320 were trained to deal with various scene understanding problems. Benefiting from object segmentation, the Conv LSTM 310 learned inter-object spatial context and object-scene dependencies with the recurrent unit using both semantic object label loss and semantic scene label loss, and the regression ConvNet was learned by mapping local object patches within scene images to parametrized object pose, position, and dimension variables so as to provide continuous-form 3D inferences. Experiments on NYU-v2 dataset demonstrate the effectiveness of introducing the LSTM recurrent unit into a pure ConvNet framework by showing consistent improvements over directly fine-tuned CNN. Also, it was demonstrated that training the regression ConvNet from scratch can achieve significantly less error rate than a fine-tuned CNN approach. In addition to achieving state-of-the-art performance on object/scene classification, object detection, and object DOF estimation tasks without requiring any depth information in the testing/operational stages, qualitative results were achieved for generating synthesized 3D scenes 170 that corresponded directly with the inferred room floor plan based on monocular indoor scene image.

Figure 4:
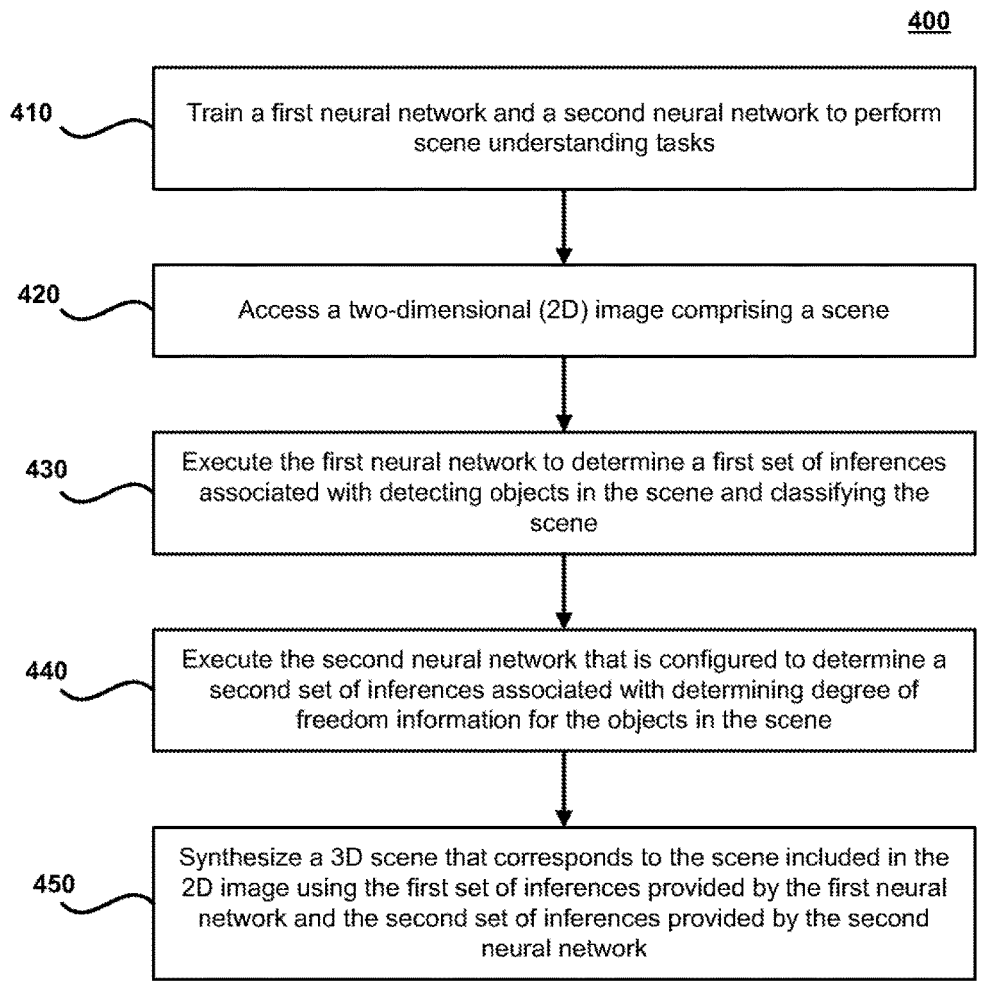
FIG. 4 is a flow chart of a method for implementing an exemplary method or technique in accordance with certain embodiments.

FIG. 4 is a flow chart of a method 400 for implementing an exemplary technique in accordance with certain embodiments. The exemplary method 400 may be executed in whole or in part by the scene generation system 150 in certain embodiments. For example, one or more storage devices 201 can store instructions for performing the steps of method 400, and one or more processors 202 can be configured to execute performance of the steps of method 400.

In step 410, a first neural network 220 and a second neural network 230 are trained to perform scene understanding tasks. In certain embodiments, the scene understanding tasks can include tasks associated with detecting objects and scenes, classifying objects and scenes, and/or determining DOF information for objects in scenes. In certain embodiments, the first neural network 220 may represent a Conv LSTM 310, and the first neural network 220 can be trained to learn dependency information 254 (including inter-object dependency information and object-scene dependency information). In certain embodiments, the second neural network 230 may represent a regression ConvNet 320. Training the first neural network 220 and a second neural network 230 can include using various loss function (e.g., semantic scene label loss function 350, semantic object label loss function 360, and/or 3D geometrical loss function 370) functions to optimize the networks.

In step 420, a two-dimensional (2D) image 130 comprising a scene is accessed. The image 130 may be accessed by a scene generation system 150 in various ways. For example, in certain embodiments the image 130 is retrieved from a database 210. The image 130 may also be provided to the scene generation system 150 by a computing device 110 over a network 190.

In step 430, the first neural network 220 is executed to determine a first set of inferences associated with detecting objects in the scene and classifying the scene. Executing the first neural network 220 can include using the first neural network 220 to analyze the image 130 that was accessed. For example, the first neural network 220 can utilize the dependency information 254 and/or other data that was learn during training to analyze the image 130.

In step 440, the second neural network 230 is executed to determine a second set of inferences associated with determining degree of freedom information for the objects in the scene. Executing the second neural network 230 can include using the second neural network 230 to analyze the image 130 that was accessed.

In step 450, a 3D scene 170 is synthesized that corresponds to the scene included in the 2D image 130 using the first set of inferences provided by the first neural network 220 and the second set of inferences provided by the second neural network 230. Joint inferences 340 can be provided by the first neural network 220 and the second neural network 230 to the 3D scene synthesizer 160 to generate the 3D scene 170. In certain embodiments, the 3D scene synthesizer 160 may utilize one or more 3D models to generate the 3D scene 170.

While various novel features of the invention have been shown, described, and pointed out as applied to particular embodiments thereof, it should be understood that various omissions and substitutions and changes in the form and details of the systems and methods described and illustrated may be made by those skilled in the art without departing from the spirit of the invention. Amongst other things, the steps in the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system for synthesizing a three-dimensional (3D) scene comprising:
one or more computing devices comprising one or more processors and one or more non-transitory storage devices for storing instructions, wherein execution of the instructions by the one or more processors causes the one or more computing devices to:
access a two-dimensional (2D) image comprising a scene;
execute a first neural network that is configured to determine a first set of inferences associated with detecting objects in the scene and classifying the scene;
execute a second neural network that is configured to determine a second set of inferences associated with determining degree of freedom information for the objects in the scene; and
synthesize a 3D scene that corresponds to the scene included in the 2D image using the first set of inferences provided by the first neural network and the second set of inferences provided by the second neural network.

2. The system of claim 1, wherein executing a first neural network that is configured to determine a first set of inferences associated with detecting objects in the scene and classifying the scene comprises utilizing inter-object dependency information and object-scene dependency information to detect the objects in the scene and to classify the scene.

3. The system of claim 2, wherein:
the inter-object dependency information indicates spatial relationships associated with the objects detected in the scene; and
the object-scene dependency information indicates a relationship between the objects and the scene.

4. The system of claim 1, wherein:
the first neural network is a convolutional long short-term memory network;

the second neural network is a regression convolutional neural network;

the first set of inferences provided by the first neural network and the second set of inferences provided by the second neural network are jointly utilized to synthesize the 3D scene.

5. The system of claim 1, wherein execution of the instructions by the one or more processors causes the one or more computing devices to:
receive ground truth information comprising object segments for a plurality of 2D images; and
train the first neural network and the second neural network using the ground truth information.

6. The system of claim 5, wherein training the first neural network comprises mapping the object segments to one or more inter-object relations, one or more object-scene relations, one or more semantic object labels and one or more semantic scene labels.

7. The system of claim 6, wherein training the first neural network with the ground truth information further comprises using a semantic object label loss and a semantic scene label loss that measures label consistencies associated with objects and scenes corresponding to the plurality of 2D images.

8. The system of claim 5, wherein the second neural network is trained using a geometric loss that measures accuracy between ground truth information and regression values obtained by the second neural network.

9. The system of claim 1, wherein synthesizing the 3D scene that corresponds to the scene included in the 2D image comprises generating the 3D scene to include a floorplan that corresponds to the 2D image and inserting the detected objects in the floorplan.

10. The system of claim 1, wherein the 3D synthesized scene is utilized by one or more of:
a virtual reality application;
a computer vision application;
an interior design application; or
a robot application.

11. A method for synthesizing a three-dimensional (3D) scene comprising:
accessing a two-dimensional (2D) image comprising a scene;
executing a first neural network that is configured to determine a first set of inferences associated with detecting objects in the scene and classifying the scene;
executing a second neural network that is configured to determine a second set of inferences associated with determining degree of freedom information for the objects in the scene; and
synthesizing a 3D scene that corresponds to the scene included in the 2D image using the first set of inferences provided by the first neural network and the second set of inferences provided by the second neural network.

12. The method of claim 11, wherein executing a first neural network that is configured to determine a first set of inferences associated with detecting objects in the scene and classifying the scene comprises utilizing inter-object dependency information and object-scene dependency information to detect the objects in the scene and to classify the scene.

13. The method of claim 12, wherein:
the inter-object dependency information indicates spatial relationships associated with the objects detected in the scene; and
the object-scene dependency information indicates a relationship between the objects and the scene.

14. The method of claim 11, wherein:
the first neural network is a convolutional long short-term memory network;
the second neural network is a regression convolutional neural network;
the first set of inferences provided by the first neural network and the second set of inferences provided by the second neural network are jointly utilized to synthesize the 3D scene.

15. The method of claim 11 further comprising:
receiving ground truth information comprising object segments for a plurality of 2D images; and
training the first neural network and the second neural network using the ground truth information.

16. The method of claim 15, wherein training the first neural network comprises mapping the object segments to one or more inter-object relations, one or more object-scene relations, one or more semantic object labels and one or more semantic scene labels.

17. The method of claim 16, wherein training the first neural network with the ground truth information further comprises using a semantic object label loss and a semantic scene label loss that measures label consistencies associated with objects and scenes corresponding to the plurality of 2D images.

18. The method of claim 15, wherein the second neural network is trained using a geometric loss that measures accuracy between ground truth information and regression values obtained by the second neural network.

19. The method of claim 11, wherein the 3D synthesized scene is utilized by one or more of:
a virtual reality application;
a computer vision application;
an interior design application; or
a robot application.

20. A computer program product for synthesizing a three-dimensional (3D) scene, the computer program product comprising a non-transitory computer-readable medium including codes for causing a computer to:
access a two-dimensional (2D) image comprising a scene;
execute a first neural network that is configured to determine a first set of inferences associated with detecting objects in the scene and classifying the scene;
execute a second neural network that is configured to determine a second set of inferences associated with determining degree of freedom information for the objects in the scene; and
synthesize a 3D scene that corresponds to the scene included in the 2D image using the first set of inferences provided by the first neural network and the second set of inferences provided by the second neural network.

* * * * *